Feb. 18, 1958 H. D. JOHNSON ET AL 2,823,779
ONE-WAY CLUTCH
Filed Dec. 3, 1953 3 Sheets-Sheet 1

Inventors
HAROLD D. JOHNSON
EARL W. BABCOCK
JOHN F. MOUGIN
by: Carlson, Pitzner, Hubbard + Wolfe
Attys.

Feb. 18, 1958    H. D. JOHNSON ET AL    2,823,779
ONE-WAY CLUTCH
Filed Dec. 3, 1953          3 Sheets-Sheet 2
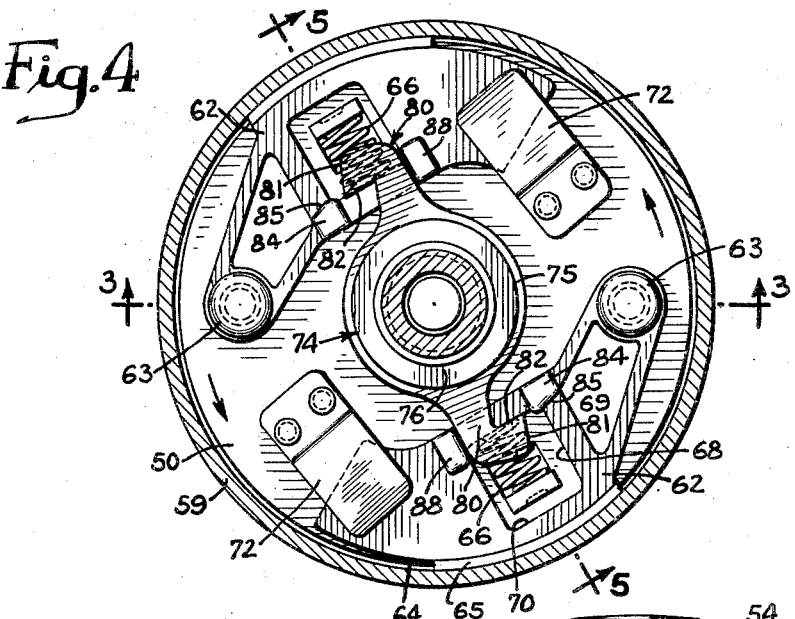
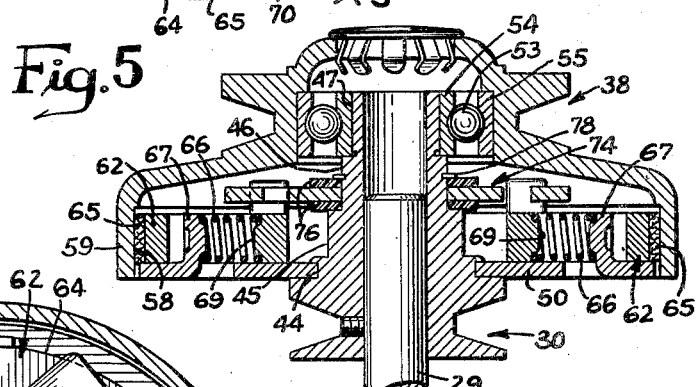
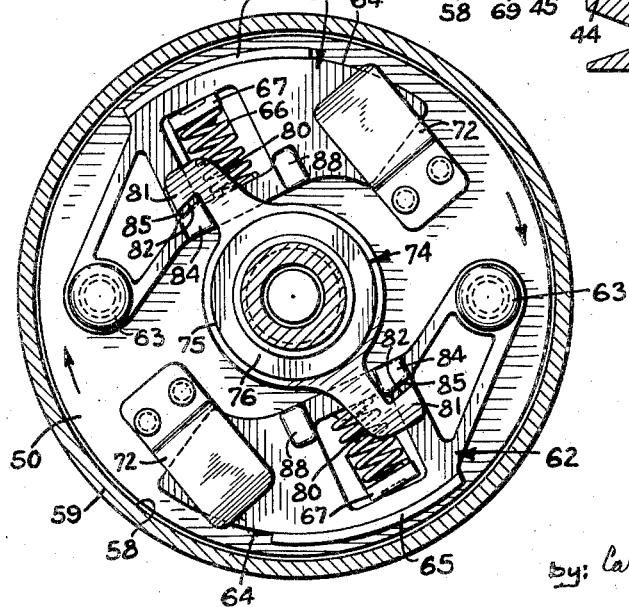
Inventors
HAROLD D. JOHNSON
EARL W. BABCOCK
JOHN F. MOUGIN
by: Carlson, Pitzner, Hubbard & Wolfe
Attys Feb. 18, 1958     H. D. JOHNSON ET AL     2,823,779
ONE-WAY CLUTCH Filed Dec. 3, 1953     3 Sheets-Sheet 3

Inventors
HAROLD D. JOHNSON
EARL W. BABCOCK
JOHN F. MOUGIN
By: Carlson, Pitzner, Hubbard + Wolfe
attys.

2,823,779
ONE-WAY CLUTCH

Harold D. Johnson, Earl W. Babcock, and John F. Mougin, Fairfield, Iowa, assignors, by mesne assignments, to Philco Corporation, Philadelphia, Pa., a corporation of Pennsylvania Application December 3, 1953, Serial No. 395,917

3 Claims. (Cl. 192—105)

The present invention relates to one-way friction clutches which will transmit power in one direction of rotation only.

One-way clutches find a particular, but by no means exclusive, application to automatic washing machines of the type having a rotatable tub for spin-drying clothes and an oscillatory agitator mounted in the tub for washing the clothes. By equipping an automatic washing machine with a one-way clutch constructed in accordance with the present invention, a change-over may be made from washing action to spin-drying action merely by reversing the direction of the driving motor.

An object of the invention is to provide a one-way clutch having new and improved means whereby the clutch, when operated in one direction, will be engaged smoothly and evenly as the driving element approaches normal operating speeds and will be disengaged automatically at lower speeds, and whereby the clutch will be positively locked in a disengaged condition and thus rendered inoperative to transmit power when driven in the opposite direction.

Another object is to provide a friction clutch having new and improved means for rendering it operative or inoperative to transmit power when it is accelerated in one direction or the other and which, when operative, will be engaged or disengaged solely as a function of speed.

A further object is to provide a one-way friction clutch having new and improved means whereby the clutch will be operative or inoperative to transmit power solely as a function of direction of operation, without regard to the torque transmitted by the clutch or other factors.

Still another object is to provide a new and improved one-way friction clutch which can be readily adapted to transmit only a predetermined torque and thus guard the driven mechanism against damage from being driven in an overloaded condition.

Further objects and advantages of the invention will appear from the following description, taken with the accompanying drawings, in which.

Figure 1:
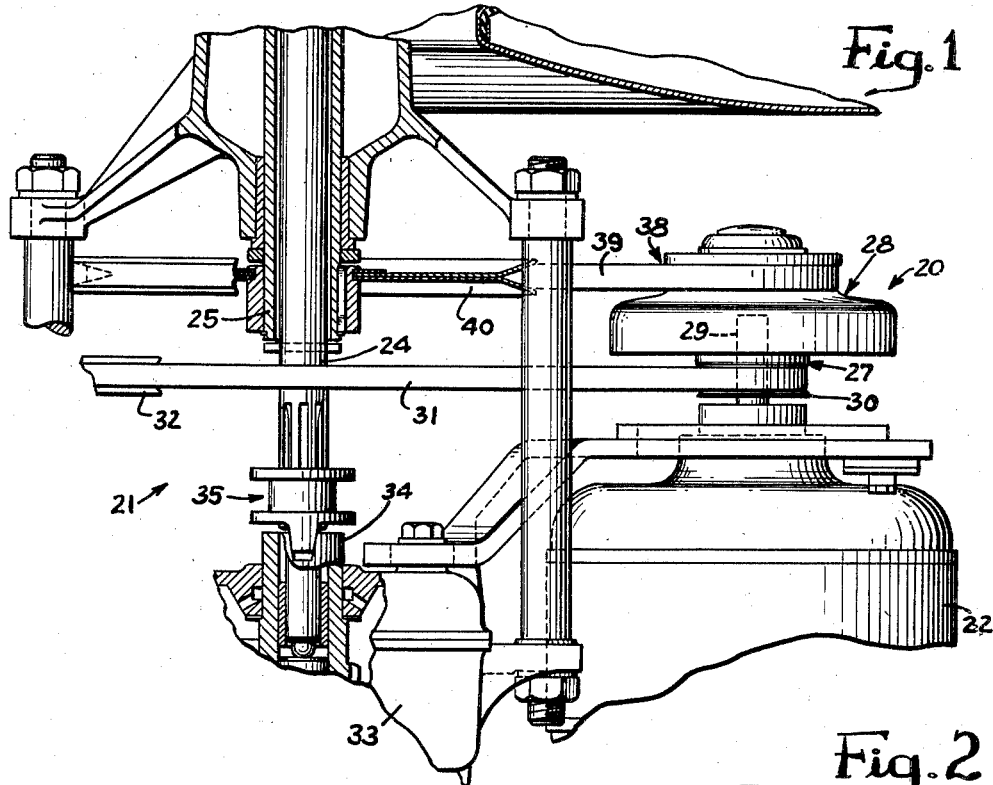
Fig. 1 is a fragmentary elevational sectional view showing a portion of an illustrative automatic washing machine equipped with an exemplary one-way clutch embodying the present invention.
Figure 2:
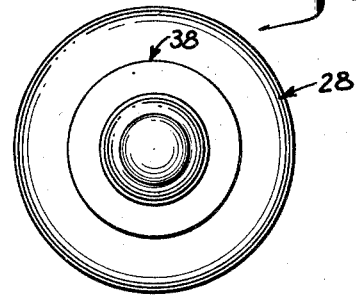
Fig. 2 is a plan view of the exemplary clutch of Fig. 1.
Figure 3:
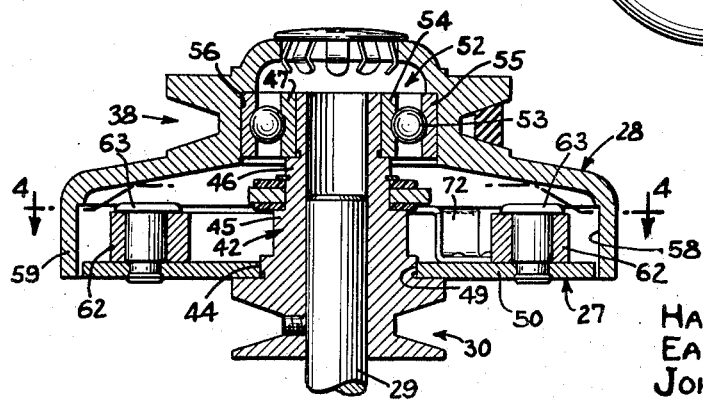
Figure 7:
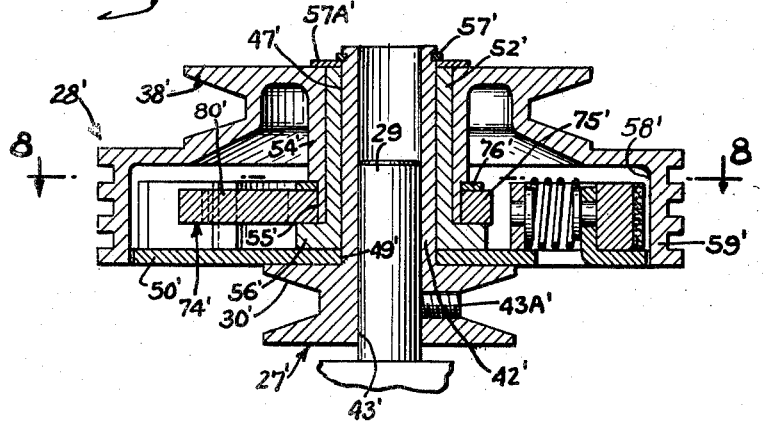
Figure 8:
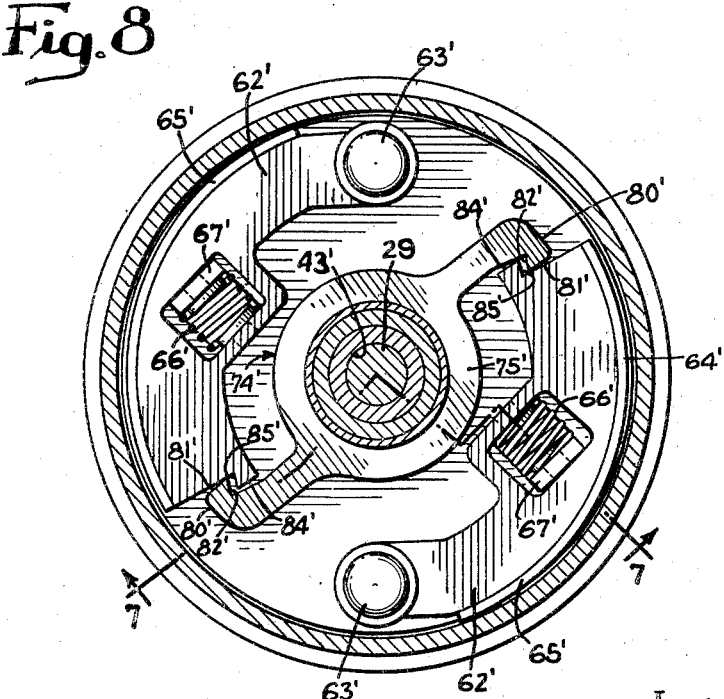

Figs. 3 and 4 are elevational and plan sectional views, respectively, of the exemplary clutch; Fig. 3 is taken generally along a line 3—3 in Fig. 4, while Fig. 4 is taken generally along a line 4—4 in Fig. 3;

Fig. 5 is another elevational sectional view of the clutch, taken generally along a line 5—5 of Fig. 4;

Fig. 6 is a plan sectional view similar to Fig. 4, but with the clutch locked in its disengaged position;

Figs. 7 and 8 are elevational and plan sectional views, respectively, of a modified one-way clutch embodying the invention; Fig. 7 is taken generally along a line 7—7 in Fig. 8, while Fig. 8 is taken generally along a line 8—8 in Fig. 7.

While the invention is susceptible of various modifications and alternative constructions, there are shown in the drawings, and will herein be described in detail, the preferred embodiments, but it is to be understood that it is not thereby intended to limit the invention to the forms disclosed, but it is intended to cover all equivalents, modifications and alternative constructions falling within the spirit and scope of the invention, as expressed in the appended claims.

It will be understood that clutches embodying the present invention may find a variety of applications. Thus, it is merely by way of example that Figs. 1-6 of the drawings illustrate a particular preferred one-way clutch 20 embodied in an automatic washing machine 21. This particular machine 21 is equipped with a reversible driving motor 22 and is arranged so that reversing the motor will effect a change-over from washing action to spin-drying action. To this end, the washing machine includes a vertical shaft 24 adapted to drive the conventional oscillatory agitator (not shown) which is disposed in a rotatable spin-drying tub (not shown) adapted to be driven by a hollow shaft 25 which is telescoped over the shaft 24.

To drive the shafts 24 and 25, the illustrative clutch 20 is provided with driving and driven elements 27 and 28 rotatable about a common vertical axis. In this instance, the driving element 27 is arranged to be mounted directly on the drive shaft 29 of the motor 22. Formed on the driving element is a peripherally grooved pulley portion 30 which is adapted to be connected by means of a V-belt 31 to a drive pulley 32. The latter operates an agitator oscillating mechanism 33 adapted to translate the rotary motion of the pulley 32 into oscillatory motion of a shaft 34. A jaw-type clutch 35 is provided for selectively transmitting the oscillatory movement of the shaft 34 to the main agitator shaft 24.

To rotate the spinner tub shaft 24, the driven element 28 of the exemplary one-way clutch 20 is formed with an integral pulley portion 38 adapted to be connected by means of the V-belt 39 to a drive pulley 40 mounted on the hollow shaft 25.

When the motor 22 is connected so that the motor shaft 29 rotates in one direction, the one-way clutch 20 will be ineffective to transmit power to the driven element 28, but the belt 31 will be operative to drive the oscillating mechanism 33. For this direction of operation, the jaw clutch 35 will be engaged by suitable means (not shown) and the agitator shaft 24 will thus be oscillated to afford a washing action. If the motor 22 is operated in the opposite direction, the clutch 20 will transmit power to the driven element 28 and thus to the spinner shaft 25, so as to provide a spin-drying action. For this direction of operation, the jaw clutch 35 will be disengaged by suitable means to prevent the elements of the mechanism 33 from being driven.

In the construction illustrated in Figs. 1-6, the driving element 27 preferably includes a sleeve or hollow shaft 42 extending upwardly from and formed integrally with the pulley portion 30. Formed on the sleeve 42 is a series of stepped internal cylindrical surfaces 44, 45, 46 and 47 of progressively decreasing diameter. The largest diameter 44 is disposed immediately above the pulley portion 30 and is received in an axial opening 49 formed in a circular mounting plate 50, the upper end of the portion 44 being riveted or spun over, as shown in Fig. 5, to secure the plate 50 rigidly to the sleeve 42.

The driven element 28 of the clutch herein shown as a generally bowl-shaped casting, is rotatably mounted on the driving element 27 by means of a ball bearing 52 comprising a set of balls 53 mounted between inner and outer races 54 and 55. In this instance, the inner race 54 is tightly fitted over the smallest diameter 47 on the upper end of the sleeve 42, while the outer race 55 is fitted into a bore 56 formed in the upper part of the driven element 28.

To cooperate with the driving element 27, the driven element 28 is provided with a clutch surface 58 which in this instance is cylindrical and is formed on the inside of a drum or skirt 59 of an enlarged diameter. As shown, the drum 59 is formed integrally with the lower end of the pulley portion 38 and is arranged to extend downwardly so as to encircle the mounting plate 50.

To transmit power to the driven element 28, the driving element 27 is equipped with movable means including a pair of movable clutch dogs or shoes 62 (Fig. 4) adapted to move into engagement with the internal cylindrical clutch surface 58. It will be understood that any number of clutch dogs may be provided as desired. In this instance, the clutch dogs 62 are in the form of arms mounted on pivots 63 riveted or otherwise fixed to the mounting plate 50 on diametrically opposite sides of the sleeve 42. Each clutch dog 62 has an arcuate outer face 64 to which a lining 65 of friction material is bonded. It will be evident that the dogs 62 will tend to swing outwardly by centrifugal action to bring the lining 65 into power transmitting engagement with the driven element 28.

To resist the centrifugal action on the dogs 62 and thus maintain the clutch disengaged at slow speeds, each dog is biased inwardly by yieldable means taking the form of the compression spring 66 acting between the dog and a lug or ear 67 struck upwardly from the mounting plate 50. In this instance, the springs 66 are disposed in openings or recesses 68, formed in the dogs 62. At the inner end of each opening 68 is a surface 69 against which one end of one of the springs 66 is adapted to bear. At its outer end, on the other hand, each opening 68 has an abutment surface 70 adapted to engage the adjacent lug 67 and thus limit the inward swinging movement of the dog 62.

To guide the dogs 62 and prevent them from chattering under load, a pair of Z-shaped springs 72 are arranged to bear at their outer ends against the upper end faces of the dogs 62. As shown, the springs 72 are riveted or otherwise fixed to the mounting plate 50.

In accordance with the invention, provision is made for restraining the dogs 62 against outward movement when the driving element 27 is rotated in one direction, while permitting such outward movement for the opposite direction of rotation. To this end, a locking element 74 is freely movable on one of the elements 27 or 28. In the clutch shown in Figs. 1-6, the locking element 74 includes an axial ring portion 75 which is freely rotatable on the external cylindrical surface 46 formed on the sleeve 42 of the driving element 27. The locking element 74 is freely rotatable on the diameter 46 between nonmetallic thrust washers 76 and is retained on the diameter 46 by means of a C-ring 78 or the like.

Formed integrally with the ring portion 75 of the locking element are outwardly extending arms 80 having latching means in the form of hooks 81 disposed adjacent the clutch dogs 62. Each hook 81 is illustrated as being provided with a somewhat undercut, generally inwardly facing latching surface 82. To cooperate with the locking element 74, each clutch dog 62 includes an upwardly projecting abutment element 84 having an abutment surface 85 which is complementary to the abutment surface 82 on the adjacent hook 81. On the opposite side of the arm 80 from the hook 81, each dog 62 is formed with an upwardly projecting stop element 88 adapted to limit the swinging movement of the locking element 74 away from the latching abutment element 84.

Although the operation of the one-way clutch will be clear from the foregoing description, it may be desirable to set forth a brief summary. If the driving element 27 is set into rotation in a counterclockwise direction, as seen in Fig. 4, the locking element 74 will tend to remain stationary, due to its own inertia. Thus, the driving element will be able to overtake the locking element 74 in a counterclockwise direction until the stops 88 on the clutch dogs 62 come into engagement with the arms 80. Thereafter, the locking element 74 will be picked up and rotated with the driving element 27. For this direction of operation, the hooks 81 will be disengaged from the latching abutments 84, so that the dogs 62 will be free to swing outwardly, due to centrifugal action. However, the springs 66 will prevent such outward swinging movement until a predetermined speed has been attained. In this way, the motor driving the clutch will be relieved of any starting load. When the driving element 27 has been brought nearly up to its normal operating speed, the centrifugal action on the dogs 62 will force the friction lining 65 on the dogs into power transmitting engagement with the clutch surface 58. Accordingly, the clutch will transmit considerable power, although it will slip if overloaded and hence will protect the driving motor.

If the driving element 27 is set into rotation in the opposite direction (clockwise as seen in Fig. 6), the locking element 74 will tend to again remain stationary, due to its own inertia. Thus, the driving element will be able to overtake the locking element 74 until the hooks 81 move into latching relation with the abutments 84, whereupon the locking element will be rotated with the driving element. It will be evident that, for this direction of operation, the hooks will prevent outward swinging movement of the dogs 62.

Since the locking element rotates along with the driving element 27 for both directions of operation, the only relative movement between the locking element 74 and the sleeve 42 will be the limited swinging movement of the locking element between the abutments 84 and 88. Thus, there will therefore be very little wear on the locking element or the cylindrical surface 46.

Figs. 7 and 8 illustrate a modified one-way clutch which, however, utilizes certain of the novel structural features of the clutch shown in Figs. 1-6. Thus, the modified clutch comprises driving and driven elements 27' and 28' provided with integral V-belt pulleys 30' and 38'. The driving element 27' includes a sleeve 42' having an axial bore 43' adapted to receive the motor shaft 29, a set screw 43A' being employed to lock the shaft 29 in the bore. In this instance, the sleeve 42' is formed with an upwardly extending cylindrical portion 47' which is inserted through an axial bore 49' in a mounting plate 50', the mounting plate being welded or otherwise fixed to the sleeve 42'.

In the modified clutch 20', the driven member 28' is rotatably mounted on the driving member 27' by means of a bushing type bearing 52' fitted into the sleeve 54' formed integrally with the driven element 28' and extending axially downwardly from the pulley portion 38'. At its lower end, the sleeve 54' has a portion 55' of reduced diameter, which abuts against a flange 56' on the lower end of the bushing 52'. The sleeve 42' on the driving element 27' may be retained in the bushing 52' by means of a C-ring 57' fitted on the upper end of the cylindrical portion 47', a washer 57A' being interposed between the C-ring and the bushing.

To cooperate with the driving element 27', an internal cylindrical clutch surface 58' is provided on a drum or skirt portion 59' formed integrally with the lower end of the pulley portion 38' of the driven element 28'. To form a driving connection between the driving and driven elements 27' and 28', a pair of clutch dogs 62' are mounted on pivots 63' riveted to the mounting plate 50'. Friction linings 65' are bonded to arcuate outer surfaces 64' on the clutch dogs 62'. To bias the clutch dogs 62' inwardly against centrifugal action, compression springs 66' are interposed between the clutch dogs and respective lugs 67' formed on the mounting plate 50'. Thus, for one direction of operation, the clutch dogs 62' will swing outwardly by centrifugal action against the resilient resistance offered by the springs, when normal operating speed is attained, and the clutch linings 65' will thereby be urged into driving engagement with the driven element 28'.

To lock the clutch 20' in its disengaged position when the driving element 27' is rotated in the opposite direction, the clutch utilizes a locking element 74' having a ring portion 75' which in this instance is rotatably mounted on the reduced cylindrical lower end 55' of the driven element 28'. The locking element 74' is freely rotatable between the bushing flange 56' and a thrust washer 76'. Formed on the ring portions 75', is a pair of outwardly extending arms 80'. One side of each arm 80' is formed into a hook 81' having an undercut latching surface 82'. To cooperate with the hooks 81', the dogs 62 are provided with latching abutments 84' which in this instance project from the outer ends of the dogs. Formed on each latching abutment 84' is an undercut abutment surface 85' which is complementary to the abutment surface 82' on the hook 81'.

If the driving element 27' is rotated clockwise as seen in Fig. 8, the locking element 74' will tend to remain stationary on the driven element 28', due to the inertia of the locking element and the slight friction between the locking element and the driven element. Thus, the driving element 27' will rotate relative to the locking element 74' and the latching abutments 84' will thereby retreat from the hook 81'. However, after limited rotation of the driving element 27', the locking element 74' will be picked up by the pivoted ends of the dogs 62' and will be carried along with the driving element 27'. When a predetermined speed is attained, the clutch dogs 62' will swing outwardly by centrifugal action and will drive the driven element 28'. When the driven element 28' has been brought up to the speed of the driving element 27', there will be no further rotary movement between the locking element 74' and the driven element 28'.

On the other hand, if the driving element 27' is rotated counterclockwise, the latching abutments 84' on the dogs 62' will overtake the hooks 81', which will tend to remain stationary, due to friction and the inertia of the locking element 74'. Thereafter, the locking element 74' will be rotated along with the driving element 27', and the undercut abutment surfaces 82' and 85' will prevent outward swinging movement of the clutch dogs 62'. The undercutting of these surfaces 82' and 85' will prevent accidental disengagement of the hooks 81' from the dogs 62'. Accordingly, the clutch will be positively held in its disengaged position.

It will be apparent from the foregoing that the invention provides a one-way friction clutch of novel and advantageous construction. The clutch while simple in construction and thus capable of being manufactured at low cost, is very rugged and dependable. The one-way action is delivered solely by direction of rotation without regard to the torque transmitted. Engagement and disengagement when rotated in the operative direction is delivered solely by the rotative speed of the driving element and is very smooth and even under all conditions. When rotated in the opposite direction, the clutch is positively locked against engagement without any possibility of accidental release that might damage the mechanism associated with it.

As previously touched upon, it is one of the features of the present clutch that the torque which can be transmitted in the driving direction is limited to a predetermined value, and any imposition of load beyond such value simply causes slippage, with the wasted energy being efficiently dissipated as heat by the bowl-shaped housing. While it is true that the device as shown does not disclose a "screw driver" adjustment of maximum torque, nevertheless it will be apparent that the construction lends itself to variation of torque by making simple modifications in accordance with techniques well known to those skilled in the art. For example, the torque can be varied in one direction or the other by using lighter or heavier springs, a light spring offering less opposition to the centrifugal force exerted by the clutch dogs 62 and consequently a greater torque at the friction surfaces. Or, the weight of the dogs themselves may be changed to increase or decrease the centrifugal force and hence the clutching action. By any of these means, and such others as will occur to one skilled in the art, it is a simple matter to adjust the clutch so that it has the desired limiting torque, as required, for example, in employing the teachings of co-pending application Serial No. 496,847, filed March 21, 1955, which discloses the above-mentioned washing machine construction more completely and to which cross reference is made.

We claim as our invention:

1. A one-way clutch, comprising, in combination, a rotatable driving member, a driven member journaled for rotation in coaxial relation to said driving member and having an internal cylindrical clutch surface adjacent said driving member, a plurality of clutch dogs mounted on said driving member for radial outward movement due to centrifugal action into driving engagement with said clutch surface, yieldable means resisting outward movement of said clutch dogs, a lock-out member journaled coaxially relative to said driving member and having a plurality of hooks adjacent said respective dogs and facing in one rotative direction, latching abutments on said respective dogs for engaging said hooks when said driving engagement is rotated in one direction, said lock-out member being swingable relative to said driving member out of latching engagement with said abutments as an incident to rotation thereof in the opposite direction.

2. A one-way clutch, comprising in combination, a rotatable driving member, a driven member journaled for rotation in coaxial relation to said driving member and having a cylindrical clutch surface, a plurality of clutch dogs mounted on said driving member and arranged for movement into driving engagement with said clutch surface in response to rotation of said driving member, means yieldably biasing said clutch dogs out of engagement with said clutch surface, a lock-out member freely journaled in coaxial relation to said driving member and having respective arm portions adjacent said dogs and formed on one side with respective hooks, means on said dogs for latching engagement with said hooks, said lock-out member being swingable relative to said driving member into latching engagement with the last-mentioned means in response to rotation of said driving member in one direction while being movable out of latching engagement with said last-mentioned means in response to rotation in the opposite direction, and means limiting swinging movement of said lock-out member relative to said driving member during rotation in said opposite direction.

3. A one-way clutch, comprising in combination, a driving member including a rotatable clutch plate, said plate having an axially extending cylindrical projection, a driven member comprising a drum journaled on said cylindrical projection and having an internal cylindrical clutch surface, a plurality of clutch dogs swingably mounted on said clutch plate for outward swinging movement under the impetus of centrifugal force into torque transmitting relation with said cylindrical clutch surface, respective springs acting between said clutch plate and said dogs for yieldably resisting outward movement of said dogs, a lock-out member loosely journaled on said cylindrical projection adjacent said clutch dogs and having a plurality of hooks corresponding to said respective dogs, said dogs having respective abutments for engagement with said hooks to lock said dogs against outward movement, said lock-out member tending to remain stationary due to its inertia so that said abutments will overtake said hooks for one direction of rotation of said driving element while retreating from said hooks for the opposite direction of rotation.

References Cited in the file of this patent

UNITED STATES PATENTS

| | | |
|---|---|---|
| 1,597,970 | Hartley | Aug. 31, 1926 |
| 2,488,313 | Miskelly | Nov. 15, 1949 |
| 2,639,794 | McNairy | May 26, 1953 |
| 2,647,602 | Maurer | Aug. 4, 1953 |